Jan. 20, 1948.     J. B. SAUNDERS     2,434,890

PUPILLOMETRIC EXPOSURE METER

Filed March 28, 1938     2 Sheets-Sheet 1

Inventor

James B. Saunders

Inventor
James B. Saunders

UNITED STATES PATENT OFFICE 2,434,890

PUPILLOMETRIC EXPOSURE METER

James B. Saunders, Alexandria, Va.

Application March 28, 1938, Serial No. 198,586

2 Claims. (Cl. 88—23)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the Act of April 30, 1928 (Ch. 460, 45 Stat. L. 467).

This invention relates to an improved type of exposure meter which utilizes the properties of the eye to adjust the pupil size to scenes of various light conditions. This property of the eye has been used by others as a basis for exposure meters, however, a practical meter using this property of the eye has never been made, primarily because under the conditions applied, the variation in the diameter of the pupil is too small to be measured with sufficient accuracy. The pupil of the eye also varies with the state of accommodation and convergence, distribution and intensity of light in the field of vision, age, errors of refraction, drugs, emotional states, etc. In order to use the eye as a means of determining photographic exposures it is necessary to obtain sufficiently precise readings which are representative of exposures only. To do this a condition must be produced whereby the variation in diameter of the pupil for a given change in intensity is increased considerably over that produced by normal viewing conditions, and the large fluctuation in the pupil for constant illumination must be reduced. The illumination of the field surrounding the object to be photographed must also have a relatively small effect on the readings of the instrument.

Under normal conditions, the dominating factors which cause the pupil to vary are accommodation and convergence, intensity and distribution of light in the field of vision. In this invention these three factors are taken advantage of by allowing them to operate within certain limitations which are controlled by the novel features of the meter of this invention.

When the eye is exposed to the full intensity of light on bright sunny days the pupil approaches its minimum possible diameter. Under this condition the change in the diameter for a given change in intensity is too small to be of practical value; especially since the pupil continually pulsates over a range of more than one third of a millimeter. By a unique screening effect, introduced by the meter of this invention, the required range of intensities acting on the pupil through the pupillometor organs of the retina is virtually shifted to a region on the intensity curve where a given change in intensity has the greatest possible effect. This condition gives a change in the variation of the pupil of more than five times the change experienced under normal viewing conditions for clear noonday illuminations.

By having the observer choose a fixation point on the object to be photographed the effect of accommodation and convergence will control the variation in exposure required for distance. When the fixation point is near the observer the pupil is larger than for a distant point, giving a resultant reading which indicates more exposure than when a distant point in a field of the same intensity is chosen. This agrees with the fact that near views require more exposure than more distant views. Another advantage of this factor is that by concentrating on a small object in the field of view, the action of the meter on the eye is to reduce greatly fluctuation of the pupil for a given intensity.

The variation of pupil size with the distribution of light in the field of vision tends to limit intensity effects to a relatively small field about the fixation point. This is due to the fact that the pupillometor fibers are concentrated almost entirely in the fovea. The fixation point being focused on the fovea centralis an image of a small area subtending an angle of approximately eight degrees about the fixation point completely covers the fovea. Light from the field outside of this area has a relatively small effect on the pupil. This property of the eye, under the conditions of light adaptation, causes the pupil to be controlled almost entirely by light from a small area about the point of interest which is chosen as the object for which detail is most desired.

By utilizing the improvements mentioned, this meter can be made to operate efficiently over a range of intensities from bright sky to normal indoor night illumination.

It is an object of this invention to provide a device for determining, by measuring the pupil of the eye, the amount of exposure required in photographic work.

It is a further object to provide a pupillometric exposure meter designed so that the eye is supplied with light in an amount to which it is relatively sensitive while measuring the light range normally used in photography.

It is also an object to provide a pupillometric exposure meter in which the proper light value is sharply indicated.

With these and other objects in view the invention resides in the parts and combinations hereinafter set forth and claimed.

Figure 1:
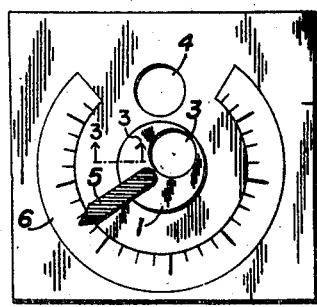
Fig. 1 is an elevational view of one embodiment of my invention.

A simple form of the exposure meter may consist of an opaque screen, shown in Fig. 1. This screen comprises two parts, a circular disc 1 and a surrounding outer section 2. The disc 1 is provided with a circumferential groove for rotating same in a circular opening provided in the outer section 2 and in which said disc is rotatable. Each section of this screen has a circular transparent opening indicated by 3, in section 1 and by 4, in section 2. In this form of the invention the "comparator" referred to hereinbefore is the opaque area between the adjacent peripheries of the openings 3 and 4 and in this case the diameter of the comparator is the distance between openings 3 and 4. Since opening 3 is off center on disc 1, the separation between the two openings, or the diameter of the "comparator" as defined, may be varied by a rotation of this disc. If this screen is placed close to the eye with the holes 3 and 4 symmetrical about the optical axis and a distant fixation point is chosen the eye will see two fields of view, one through each of the holes. If the diameter of the "comparator," or in this case, the distance between openings 3 and 4, is less than the diameter of the pupil these two fields will overlap in the region about the fixation point. If the diameter of the "comparator" is made equal to the pupil by separating openings 3 and 4 the two fields will be tangent to each other at the fixation point. Further increase in the size of the "comparator" (separation of openings 3 and 4) causes the two fields to become separated and the fixation point will be entirely obscured by the "comparator." The condition of vision about the fixation point, when the diameter of the "comparator" equals that of the pupil, is unique and will be defined as the reading point for the instrument. A pointer 5, fastened rigidly to the disc 1, is positioned to move over a circular scale 6, which may be calibrated to indicate diameters of the pupil; or since any diameter of the pupil is characteristic of a definite degree of illumination requiring a corresponding exposure this scale may be calibrated directly in terms either of light intensity or exposure values.

Figure 2:
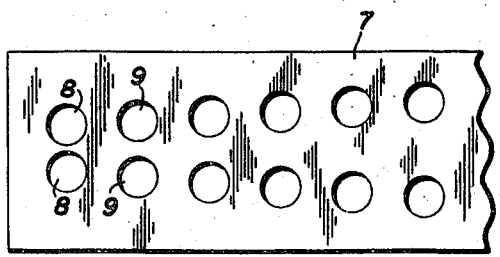
Fig. 2 is a similar view of another embodiment of my invention.

Since all cameras are designed for certain arbitrary exposure steps a continuous variation of the "comparator" is not essential. If the size of the comparator corresponding to each of these exposure steps is known, a series of fixed comparators having the proper sizes to give all the readings for which a camera is designed may be used. Such a series of "comparators" is shown in Fig. 2. The screen in this form is a strip of opaque material 7, with pairs of holes 8, 8; 9, 9; etc., with the spacing between holes of one pair differing from that of the holes of other pairs. In this case the comparator is the opaque area between the two holes of a pair and the variation on its diameter is accomplished by shifting from one pair of holes to the next. In this case, the largest comparator or the pair of holes with the greatest spacing between them which fails to obscure the fixation point will be considered the proper reading point.

Figure 4:
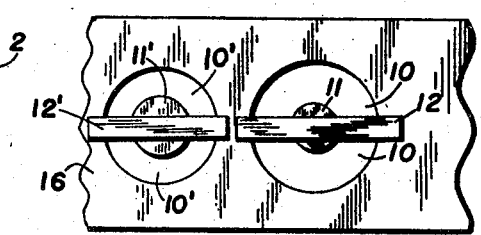
Fig. 4 is a fragmentary elevational view showing another modification of the present invention.

Another form of the invention is shown in Fig. 4, which differs from that of Fig. 2 only in shape of holes; but this form produces a much sharper shadow between the obscured and visible parts of the field. In this figure, screen 16 is provided with a series of openings 10, 10; 10', 10'; etc. Each of these openings cooperate to form an annular opening having disc 11, 11', etc., supported concentric therein by bars 12, 12', etc. The sizes of disc 11, 11', etc., vary from one end of the screen to the other. These discs are the "comparator" defined above.

Figure 5:
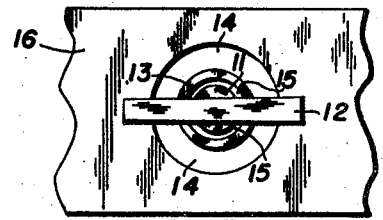
Fig. 5 is a view similar to Fig. 4 showing a further modification of this invention.
Figure 3:
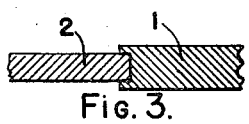
Fig. 3 is a partial sectional view taken on line 3—3 of Fig. 1.

By supporting the ring 13 (shown in Fig. 5) in the position shown, the semi-annular holes 10, 10, of Fig. 4, may be divided to form holes 14, 14 and 15, 15 of Fig. 5, and the definition of the reading point becomes extermely sharp. The sharpness of this definition is best shown by the family of curves shown in Fig. 8, which is explained by means of Figs. 6 and 7.

Figure 6:
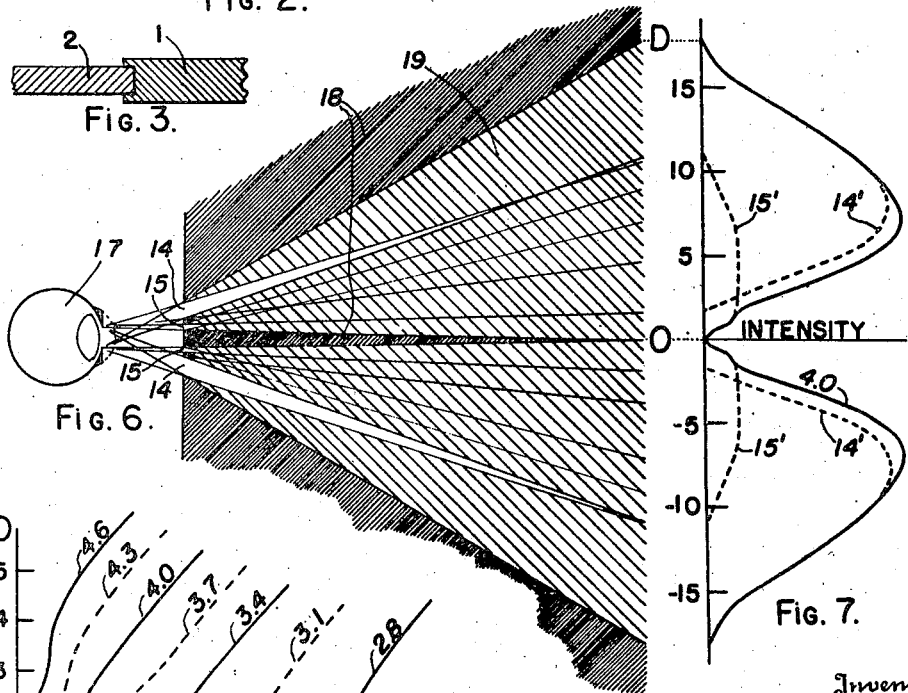
Fig. 6 is a diagram illustrating the shadow effect produced by a device according to the present invention on the eye.
Figure 8:
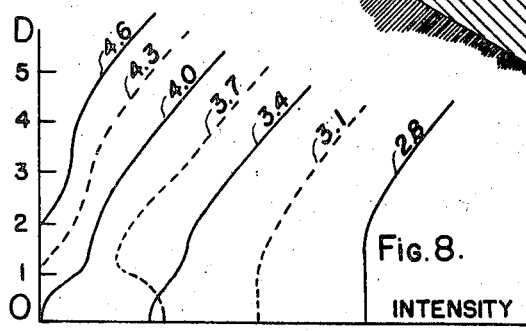
Fig. 8 is a similar representation of the shadow effects produced by each of several "comparators" of different diameters used in combination with a constant size pupil.
Figure 7:
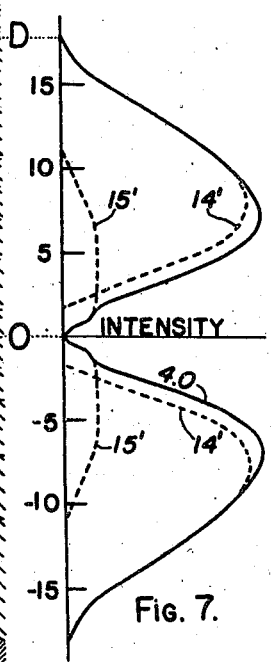
Fig. 7 is a graphical representation of this shadow effect on the retina.

Fig. 6 shows the relative position of the eye 17, and a screen similar to that shown in Fig. 5, when placed in position for use. The "comparator" is of the correct size to give a proper reading point. The umbraic and penumbraic regions produced by the screen are indicated by the shaded sections 18, and 19, respectively. The resultant shadow effect produced by each of the openings 14, and 15, on the field of view along the line OD, is indicated by the corresponding curves 14', and 15', shown in Fig. 7. Each of these curves represent the distribution of light on the retina from the center towards the periphery (measured in degrees). Since the field of view is focused on the retina with the image of the fixation point on the fovea centralis these curves also represent the shadow effect observed by the eye. For computing these curves the focal length of the eye lens is taken as 20 mm., the diameter of the pupil as 4 mm., the distance between the screen and pupil as 30 mm. and the distance between the screen and fixation point is large compared to that between the screen and pupil. The composite results of curves 14', and 15', are shown by curve 4.0 in Fig. 7. The same curve is shown in Fig. 8, along with other similar curves each of which represent the distribution of light on the retina produced by "comparators" of different diameters. The numbers corresponding to the separate curves represent the diameters of the corresponding "comparators" used. Curve 4.0, is the effect observed when a "comparator" having the same diameter as that of the pupil (i. e. 4 mm.) is used. The sharp definition of the proper reading point is indicated by the abrupt change in the curves of Fig. 8 from the use of a "comparator" slightly smaller than the pupil to one slightly larger. A "comparator" larger than the pupil, however, small the difference may be, completely obliterates the fixation point whereas a smaller "comparator" allows more light to enter the eye from the fixation point than from the adjacent parts of the field. The condition of light adaptation amplifies the effect further, since for this condition the fovea is from two to nearly fifty times more sensitive to light than the perpherial area of the retina.

Figure 9:
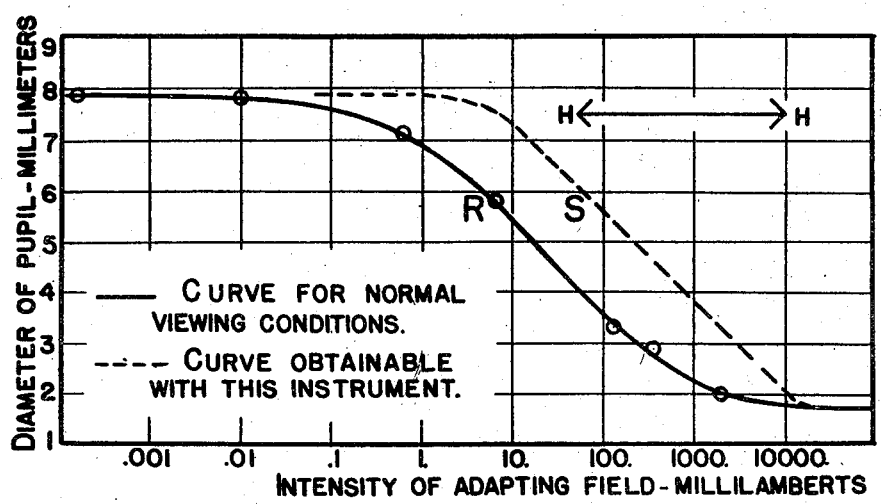
Fig. 9 is a graphical representation of the variation of the pupil with intensity of illuminated field.

The curves shown in Fig. 9, represent graphically the pupillary variation with brightness of the adapting field. Curve R, gives the variation under normal viewing conditions with one eye closed and curve S, gives the variation obtainable with this meter. The range of intensities used for most photographic work is from 50 to 10,000 millilamberts, indicated by double arrow H H. According to Barnister and Hartridge (Coruptes Rendus, vol. 199; p. 91; 1934) "the contraction of the pupil for brightnesses in excess of one thousand millilamberts is slight." The variation in this range (the most important for amateur photographers) is so small that no iefinite results have been found. However, when the observed illumination of the field is altered by the above form of screen the corresponding curves of variation is altered by virtually shifting the range of intensities in which most photographic work is done to the region where the variation in pupillary diameter is greatest. In this region of curve S, the variation is almost linear. By a proper choice of size and shape of the openings the resultant variation may be made constant throughout the range of intensities from bright sky to that of normal indoor night illuminations.

The slope of curve S, is very near the same for all normal eyes, but the size of the pupil for any given intensity may vary with different individuals. It may therefore be necessary to adjust the instrument to the eye of the individual user as well as to the speed of the photographic film being used.

Figure 10:
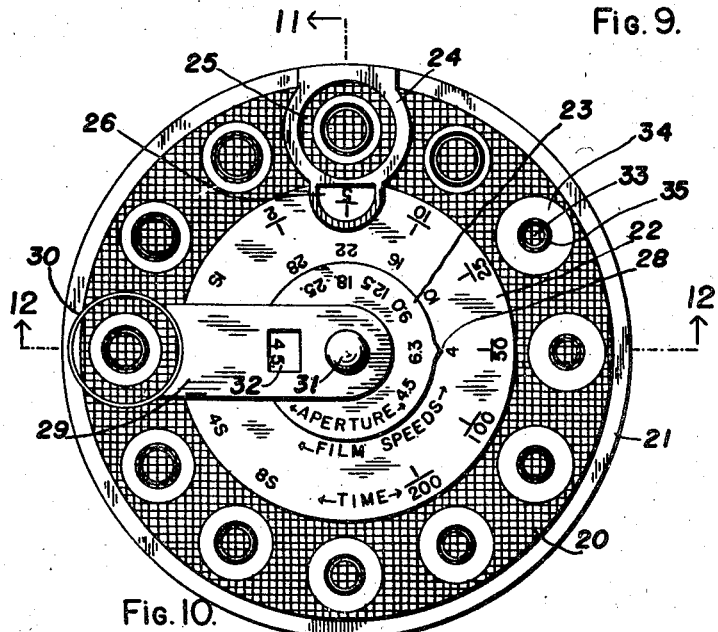
Fig. 10 is a face view of a form of exposure meter of this invention.
Figure 11:
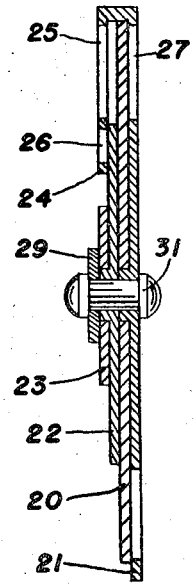
Fig. 11 is a vertical section view along the line 11—11 of Fig. 10.
Figure 12:
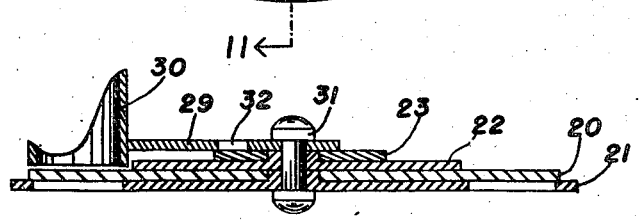
Fig. 12 is a horizontal section view along the line 12—12 of Fig. 10.

In the form shown in Figs. 10, 11 and 12 I use a screen which consists of a transparent disc 20, supporting black opaque surfaces which replace the opaque parts 11, 13, and 16 of Figs. 4 and 5. With transparent material as a base for supporting the disc 11, and ring 13, of Figs. 4 and 5 the supporting bars 12, 12', etc. are not required; thus improving further the sharpness of the settings for the proper reading points. In Figs. 10, 11 and 12 the comparators, or small opaque discs 33, are equally spaced around the circular screen 20, with a uniform variation in diameters. An opaque ring 35, corresponding to rings 13 of Fig. 5, surrounds the opaque disc 33. The area of the annular openings also vary so as to give the proper variation in readings for exposure as explained in connection with Fig. 9.

In Figs. 10, 11 and 12 the screen 20, is assembled with three opaque discs 21, 22 and 23 for rotation about pin 31. Disc 21, carries an indicating plate 24, provided with two openings 25 and 26. The opening 25, is adapted to coincide with one of a plurality of openings one of which is labeled 27 in disc 21, Fig. 11. Disc 21, has as many equally spaced, circular openings 27 as there are comparators or disc 33 on the screen 20. The openings 27 are so spaced that disc 21, does not obstruct light from either of the openings 34 in the screen 20 as long as one comparator is concentric with the opening 25. Time and film-speed scales are carried by disc 22. Disc 23, carries the aperture scale and has a pointer 28, which is to be set on the speed of the film being used. The arm 29, carries the eye-cup 30, and is rotatable about the common axis 31, of all four discs. An opening 32, in the arm 29, exposes the required aperture to be used with the shutter speed given in the opening 26, of the indicator plate 24, for obtaining the required exposure. The eye-cup 30, is so shaped as to prevent all light from reaching the observing eye except that coming through the transparent opening of the screen 20 about the comparator or disc 33 under test. This cup also serves to maintain a constant distance between the eye and the comparator.

The bearings of the four discs and the arm 29, are so constructed that discs 21, 22, and the arm 29, each are free to rotate independently of each other. Discs 20, and 23, however do not rotate directly on the center pin 31 (see Figs. 11 and 12), but rotate bodily with discs 21 and 22 respectively except when the latter is constrained while the former is forced to rotate.

To use this instrument, it is first calibrated to fit the individual user's eye by locating the "comparator" or disc 33 that gives the proper reading point for a standard scene. A standard scene should be one of practically invariable light intensity such as the northern sky at noon on a clear day. While applying the exposure meter to the standard scene, the proper comparator or disc 33 is then placed concentric with opening 25, in the plate 24, by holding disc 21, while the screen 20 is being rotated to this position. The pointer 28, is then set on the speed of the film to be used, by rotating disc 23, while disc 22, is being constrained from rotation.

In all cases the observer closes the eye not being used for the test and the observing eye is placed as close into the eye-cup as possible.

To obtain the proper exposure for any scene, the observer chooses a fixation point on the object in the scene for which detail is most desired, or if the whole scene is of equal importance, the fixation point is chosen in an area of mean illumination. The largest comparator that fails to obscure the fixation point is then located by placing successively the various comparators concentric with the eye-cup for test.

The fixation point only is completely shielded. Light from the fixation point that enters the eye, is a long diverging cone—the fixation point being the vertex and the pupil being the base of the cone. The lens of the eye changes this light from a diverging to a converging beam—forming another cone whose vertex is the fovea centralis and whose base is the lens itself. The light from any other point in the field of view, that enters the eye, also is conical but none of these conical beams coincides with that originating from the fixation point. Consequently, an opaque disc (or comparator) that is just sufficient to intercept the cone from the fixation point, will fail to intercept completely that from any other point. Therefore, this opaque disc will completely shield the fixation point from the retina and no other point will be so completely shielded. The whole field is visible with the exception of the fixation point. A slightly larger disc will shield a small circular field from view, the center of said circular field being the fixation point. A slightly smaller disc will fail to shield any point completely.

With the eye-cup held in this position with respect to discs 20 and 21, the required exposure (shutter speed and diaphragm opening) is given in the two openings 26 and 32. If a different shutter speed than that shown in opening 26 is needed, the aperture reading must be changed accordingly by rotating discs 22 and 23, together with respect to the screen and eye-cup until the desired shutter speed appears in opening 26.

In Figs. 1, 2, 4 and 5, I have shown screens in which two transparent portions are provided on opposite sides of the comparator. In Fig. 10, I have shown a screen in which the comparator is completely surrounded by a continuous transparent portion. It is within the concept of this invention to divide the continuous transparent portion surrounding the comparator into a plurality of circumferentially spaced transparent portions. In every case, however, the circumferential spacing between any two adjacent transparent portions about the comparator should not exceed 180°. This modified form of the invention will, of course, comprise screens in which the comparators are surrounded by groups of three or more transparent portions or openings. In this instance, the circumferential spacing between two adjacent transparent portions of the group surrounding the comparator should not exceed 180°.

While I have shown and described the preferred embodiment of my invention, I wish it to be understood that I do not confine myself to the precise details herein set forth by way of illustration, as it is apparent that many changes and variations may be made therein by those skilled in the art, without departing from the spirit of the invention or exceeding the scope of the appended claims.

I claim:

1. An exposure meter comprising a sheet adapted to be placed close to the pupil of an operator's eye perpendicular to the optical axis of the eye, said sheet consisting of opaque and transparent parts forming a series of comparators of graduated size; each of said comparators comprising an opaque disc bounded by an annular transparent area concentric with said disc and with said annular transparent area bounded by an annular opaque area concentric with said transparent area and with said annular opaque area bounded by an annular transparent area concentric with said opaque area, and an opaque screen surrounding the composite areas of each of said comparators, whereby the pupil of the eye of the operator may be occulted by one of the comparator discs from a chosen fixation point except for an annular area about the periphery of the pupil.

2. A gauge for use in determining whether the intensity of illumination of an object is equal to, greater than or less than, a predetermined standard which comprises a sheet having a circular opaque area of a preselected pupil diameter surrounded by a narrow annular transparent area concentric with said circular opaque area, said narrow annular transparent area in turn being surrounded by a narrow annular opaque area concentric therewith, whereby when said sheet is held close to the eye of an operator with the opaque disc thereon perpendicular to the optical axis of the operator's eye and concentric with the pupil thereof the operator "sees" a fixation point on the object whose illumination is to be guaged as a nebulous dark spot with a lighter center or a nebulous dark spot or as a solid black spot, depending on whether the object is illuminated to an intensity equal to, greater than or less than a predetermined standard.

JAMES B. SAUNDERS.

REFERENCES CITED

The following references are of record in the file of this patent:

UNITED STATES PATENTS

| Number | Name | Date |
| --- | --- | --- |
| 1,358,472 | Smith | Nov. 9, 1920 |
| 1,414,972 | Aiken | May 2, 1922 |
| 2,010,301 | Helfer | Aug. 6, 1935 |
| 2,105,255 | Mihalyi et al. | Jan. 11, 1938 |

FOREIGN PATENTS

| Number | Country | Date |
| --- | --- | --- |
| 16,411 | Great Britain | Jan. 21, 1909 |
| 83,913 | Austria | May 10, 1921 |
| 12,318 | France | June 8, 1910 |
| | (Addition to 392,874) | |
| 170,870 | Switzerland | Oct. 16, 1934 |